3,556,798
METHOD OF USING SORBIC ACID AND SORBATES AS DOUGH CONDITIONING AGENTS

Don R. Tucker and Lloyd L. Green, Louisville, Ky., and Howard K. Zimmerman, New Albany, Ind., assignors to The Pillsbury Company, Minneapolis, Minn., a corporation of Delaware
No Drawing. Filed Apr. 9, 1968, Ser. No. 719,836
Int. Cl. A21d 2/14
U.S. Cl. 99—90                                                   20 Claims

ABSTRACT OF THE DISCLOSURE

Chemically leavened dough products having improved handling and machinability properties for commercial dough fabricating processing are provided by admixing and developing dough ingredients with at least one dough conditioning agent selected from the group consisting of sorbic acid and the alkaline earth and alkali metal salts of sorbic acid in an amount ranging from about 0.005 to about 0.20 part by weight for each 50 parts by weight flour therein.

---

This invention relates to the art of making of baked goods and the products produced thereby. More particularly, the present invention relates to chemically leavened dough products and the method of producing said dough products.

Heretofore, numerous conditioning agents have been proposed to modify the properties of dough products. U.S. Pat. No. 3,053,666 by Henika et al. discloses the employment of gluten activating agents (e.g., L-cysteine hydrochloride) and gluten maturing agents (e.g., potassium bromate) as dough additives for yeast leavened dough products. Similarly, other organic mercaptans have been proposed for baking dough as an additive to reduce the necessary mixing time for baking doughs in U.S. Pat. No. 2,492,580 by Marhafer. Other dough modifying agents proposed by the art include oxidants such as potassium bromate, sodium perborate and ammonium persulfate (British Pat. No. 2,778 of 1911), carrageenin (U.S. Pat. No. 3,234,027 by E. C. Jerstan et al.), sodium bisulfite (U.S. Pat. No. 3,149,979 by R. M. Bohn et al.) and ascorbic acid and isomers thereof (U.S. Pat. Nos. 2,149,682 and 3,304,183 by W. R. Johnston et al.). Although many of the aforementioned dough conditioners substantially alter the dough, such additives lack, in general, the ability to increase the dough extensibility without any accompanying reduction of dough resistance.

Sorbic acid and the alkali and alkaline earth sorbate salts are known to the art to possess mold inhibiting or fungistatic properties. Sorbic acid and sorbates have also been incorporated into yeast-leavened bakery products, however, it has been necessary to employ relatively small amounts of encapsulated sorbic acid or sorbate particles (e.g., less than 0.025 percent) to prevent inhibition of the yeast leavening activity.

It is an object of the present invention to provide a method of increasing dough extensibility accompanied by a decrease in the resistance thereof to dough machining.

Another object of the present invention is to reduce the mixing time necessary to impart a developed dough character in dough compositions.

A still further object of the present invention is to provide a dough composition having improved handling and machinability properties.

According to the present invention there is provided a method of preparing a chemically leavened dough composition possessing improved dough handling and machinability properties, said method comprising:

(a) Providing a dough ingredient composition containing 50 parts by weight flour, water in an amount ranging from about 25 to about 35 parts by weight, chemical leavening and at least one edible member selected from the group consisting of sorbic acid, the alkaline earth salts of sorbic acid and the alkali metal salts of sorbic acid in an amount ranging from about 0.005 to about 0.20 part by weight dough conditioner for each 50 parts by weight flour; and (b) Mixing the dough ingredient composition at a temperature of less than 65° F. for a period of time and under mixing conditions sufficient to provide a dough characterized as exhibiting maximum extensographic resistance to extension ranging from at least 400 Brabender units and less than 900 Brabender units and an extensibility of greater than 100 millimeters but less than about 200 millimeters, said dough mass being further characterized as having a farinographic reading of greater than 600 but less than about 1300 Brabender units.

By employing the appropriate mix ingredients and amounts thereof coupled with proper mix conditions, it has been unexpectedly discovered that unique and improved characteristics are imparted through the use of sorbic acid or the alkaline earth and alkali metal sorbates as a dough conditioning agent. Although the dough compositions provided herein exhibit a substantial increase in dough extensibility, this result is achieved with a concomitant substantial reduction in dough resistance. The reduction in dough resistance from the present dough composition as provided herein, however, is achieved without a concomitant undesirable property of being overstressed when the elongated dough composition is stretched or conveyed between dough sheeting rolls (i.e., the modulus of elasticity is not exceeded). Thus, the instant dough conditions exhibit improved sheeting and machinability properties when subjected to conventional and commercial dough fabrication processes. In addition to improving the dough properties, the utilization of the present dough conditioning agents provide a substantial reduction in mixing time necessary for imparting the desired developed dough character. Since the sorbic acid and the sorbates have fungistatic properties, the present dough products also inherently enhance mold inhibition and preservative character thereto.

In preparing the dough composition there is provided as dough ingredients from about 25 to about 35 parts by weight water for each 50 parts by weight flour. Suitable flour for practicing the present invention includes farinaceous materials such as the cereal grain flours like wheat, rice, maize, oats and barley, etc. Large amounts of starch may be substituted for the flour provided the farinaceous material contains a sufficient amount of gluten (e.g., wheat gluten) to provide a developed dough character hereinafter more fully described. Typical flours or farinaceous materials adaptable include those flours which are conventionally employed in preparing bakery products such as rolls, biscuits, pastry, pie crusts and particularly those flours suitable for preparing refrigerated chemically leavened, laminated dough products adapted for packaging and distribution in pressure retaining containers. Preferably adaptable herein are the hard and soft wheat flours having a wheat protein content ranging from about 9 to about 15 percent by weight.

In addition to the flour and water dough ingredients, at least one edible dough conditioning agent selected from the group consisting of sorbic acid, the alkaline earth and alkali metal salts of sorbic acid in an amount ranging from at least 0.005 to about 0.20 part by weight for each 50 parts by weight flour is employed as a dough ingredient. Illustrative dough conditions include calcium sorbate, potassium sorbate, sodium sorbate, sorbic acid, mixtures thereof and the like. It is necessary to provide the present dough conditioning agents in a form such that its functionality in imparting a developed or gluten structure upon mixing of the dough ingredients is unimpaired. Thus, sorbic acid and sorbates which have been coated with a water-insoluble barrier or coating or lipophilic materials such as mono- and diglycerides, fats and the like adversely impair the present dough conditioning agents functionality. In general, any commercially available food grade sorbic acid or sorbate is suitable. Improved developed dough characteristics are advantageously provided by the utilization as ingredients from about 27 to about 33 parts by weight water and from about 0.01 to about 0.1 part by weight dough conditioner for each 50 parts by weight flour. The preferred amount of water and dough conditioner respectively being from about 30 parts by weight and an amount of dough conditioner ranging from about 0.015 to about 0.05 part by weight for each 50 parts by weight flour. Although the flour, water and dough conditioner may be admixed together, increased functionality of the dough conditioning agent (i.e., greater gluten development activity) and a more uniform distribution of the conditioning agent throughout the ingredient composition during mixing is accomplished by providing a uniform preblend of an edible carrier or diluent as a major preblend ingredient along with the dough conditioning agent. Suitable carriers for such a preblend include flour, aqueous mediums such as egg yolk, milk, water and the like.

Other ingredients generally in minor amounts which do not adversely affect the dough development such as sucrose (e.g., in an amount generally less than 3 parts by weight for each 50 parts by weight flour), hydrophilic film former (e.g., egg albumen, hydrolyzed soy protein, carboxymethylcellulose, guar gum, hydroxyethylcellulose, casein, sodium caseinate, egg whites and yolk and the like), flavoring and coloring agents, preservatives, antioxidants and the like may be employed, if desired, as dough ingredients in addition to the water, dough conditioner and flour ingredients. Excessive amounts of dough additives which imbibe or inhibit gluten development such as salts, leavening acids and bases, the invert sugars, oxidizing agents, shortening, surface active agents, etc., are preferably not added until after first developing the dough structure.

Although all of the ingredients necessary for producing the ultimate dough product may be mixed together in conventional dough mixing equipment for a period of time and at a temperature sufficient to impart the dough product having the farinographic and extensographic properties herein described, substantial reduction in the necessary mixing time is accomplished by employing what is hereinafter referred to as a two-stage mixing method.

Accordingly, in a more limited aspect of the invention there is provided a two-stage mixing method for preparing a chemically leavened dough possessing improved dough mixing, machining and handling properties, said method comprising the steps of:

(a) Providing an ingredient composition comprised of 50 parts by weight flour, water in an amount ranging from about 25 to about 35 parts by weight water and an edible dough conditioning agent of at least one member selected from the group consisting of sorbic acid, the alkaline earth salts of sorbic acid and the alkali metal salts of sorbic acid in an amount ranging from about 0.005 to about 0.20 part by weight dough conditioner for each 50 parts by weight flour;

(b) Mixing said ingredient composition at a temperature of less than 65° F. and for a period of time sufficient to provide a dough characterized as having a maximum farinographic reading of greater than 400 Brabender units but less than about 700 Brabender units;

(c) Adding to the dough at least one leavening agent selected from the group consisting of an edible leavening acid and an edible leavening base; and (d) Mixing the dough containing the added leavening agent at a temperature of less than 65° F. under mixing conditions sufficient to provide a dough mass characterized as exhibiting a maximum extensographic resistance to extension ranging from at least 400 Brabender units and less than 900 Brabender units and an extensibility of greater than 100 millimeters but less than about 200 millimeters, said dough mass being further characterized as having a maximum farinographic reading of greater than 600 but less than about 1300 Brabender units.

In the two-stage mixing method, the flour, water and conditioning agent along with those ingredients which do not adversely disrupt the development are admixed in conventional dough mixing equipment for a period of time sufficient to provide a dough characterized as having a maximum farinographic reading of greater than 400 but less than about 700 Brabender units (hereinafter referred to as "first stage mixing"). During the first stage mixing step, it is necessary to maintain the mix ingredients at a temperature of less than 65° F. and generally greater than 50° F. Employment of a dough mixer provided with adequate cooling means plus ice as part of the water (usually 30 to 50 percent ice based on the total ice and water weight) is satisfactory for controlling the mixing temperature.

Excessive mixing or overdevelopment of the dough structure during the first stage mixing step should be avoided. By running farinographic tests upon the mixed doughs one can ascertain whether or not the dough has achieved the 400 to 700 Brabender units reading. A dough which upon mixing in the farinographic equipment exhibits a decline in viscosity within one or two minutes of farinographic testing has been mixed excessively. In contradistinction thereto a properly mixed dough will have a farinographic reading after one or two minutes testing within the range of 400 to 700 Brabender units plus a farinographic curve depicting either a level or increased viscosity readings upon additional mixing by the farinographic equipment. An increasing farinographic curve is characteristic of a dough which has not yet reached its maximum state of gluten development. A fully developed dough exhibits a substantially level farinographic curve during the initial farinographic testing thereof.

Upon completion of the first stage mixing step, at least one leavening agent selected from the group consisting of an edible leavening acid and base is added to the dough. To obviate premature leavening activity and enhance dough development during the first stage mixing step, it is advantageous that at least a major portion of the desired leavening base be added to the resultant dough obtained from the first stage mixing step. However, it is preferable that substantially all (e.g., more than 90 percent) or all the leavening base and acid be added to developed dough after completion of the first stage mixing step.

Any leavening system capable of reacting to release a gas and provide volume to the baked product may be used. Conventionally, an alkaline bicarbonate of baking grade such as sodium bicarbonate and potassium bicarbonate and one or more edible leavening acids are used for this purpose. Illustrative acids suitable for refrigerated dough products including laminated doughs are glucono delta lactone, sodium acid pyrophosphate, sodium aluminum phosphate hydrate, sodium aluminum phosphate anhydrous, mixtures thereof and the like. Examples of other edible leavening acids in minor amounts include cream of tartar, adipic acid, fumaric acid, citric acid, tartaric acid, etc.

The amount of chemical leavening added to the dough varies over a wide range and depends to a large extent upon the particular desired end product as well as the neutralization equivalent of the leavening system employed. Based upon the total weight of the final dough product, the amount of chemical leavening added generally ranges from about 1 to 5 percent with the 2 to 4 percent level being most commonly used.

In addition to the chemical leavening, other ingredients necessary to provide the desired dough product but which were not employed as developed dough ingredients in the first stage mixing step are also added thereto. Typical ingredients added after the first stage mixing step include those dough ingredients which imbibe or inhibit gluten development such as salts, invert sugars, oxidizing agents, shortening surface active agents, mixtures thereof and the like.

The chemical leavening and other added ingredients are then uniformly incorporated into the developed dough product by further mixing thereof (hereinafter referred to as "second stage mixing"). The second stage mixing step is conducted within the range of the first stage mixing step and preferably between about 55° F. to about 60° F. The second stage mixing step is continued for a period of time sufficient to provide a dough characterized as having an extensographic reading exhibiting a resistance to extension ranging from at least 400 but less than 900 Brabender units and an extensibility greater than 100 and less than 200 millimeters and a maximum farinographic reading ranging from greater than 600 to less than 1300 Brabender units.

The aforementioned farinographic and extensographic readings are indicative of a developed dough character in contradistinction to an undeveloped dough wherein the gluten structure has not been adequately worked to develop dough elasticity and a cell structure capable of retaining gas. This developed dough character is not entirely a function of mixing time but is also dependent upon the composition and dough ingredients employed (e.g., the flour type and protein content thereof), moisture content, type of mixer and the amount of work applied thereto (e.g., mixing speed and equipment employed).

The farinographic readings as applied to the present disclosure were ascertained by the American Association Cereal Chemist Method 54.21 as modified hereinbelow employing a Brabender Farinograph Model PL-2H equipped with a Sigma blade, stainless steel mixer bowl by C. W. Brabender Instruments and a heat transfer water pressure means for operation to 60° F. In general, the following testing procedure was employed:

(1) Farinograph temperature is adjusted to 60° F. by allowing the testing apparatus at least one hour to adjust thereto;
(2) A 1000-gram sample of the dough was obtained from the dough mixes for testing;
(3) The dough sample was allowed to remain 5 minutes after mixing at room temperature (i.e., 23° C.) in a relaxed state (i.e., not worked such as by stretching, blending and/or kneading);
(4) The dry or exposed outer surface of the dough sample was removed therefrom (e.g., with a scissors);
(5) A 480-gram sample was placed in the farinograph bowl;
(6) The farinograph chart was set at zero and the dough mixed for 5 minutes beyond farinographic peak readings or development; and
(7) Read and record from farinographic curves;

(a) dough consistency—Brabender unit's center line at minimum and maximum consistency;
(b) time to peak—minutes.

Under the aforementioned testing procedure, a highly developed dough mass differs extensively from an undeveloped dough mass in that the former exhibits a farinographic reading differential of less than 100 Brabender units (i.e., difference between the center line for the maximum and minimum farinographic readings) whereas the undeveloped dough generally exhibits a differential between maximum and minimum readings of about 200 Brabender units or more.

Another useful means of determining the dough character is to ascertain the number of minutes necessary under the aforementioned testing conditions to achieve a peak farinographic reading. It has been experienced that dough ingredients containing the present dough conditioning agents upon dough mixing conditions reach a peak farinographic reading much more readily than doughs without the instant conditioning agents. Reducibility or experimental error on duplicate samples via the aforementioned farinographic testing procedures is within ±20 Brabender units.

The extensographic readings were ascertained in general by the American Association Cereal Chemist Method 54-10 (the "Extensograph Method") as modified hereinbelow employing the following testing procedure:

(1) Adjust extensograph temperature control bath to maintain 60° F. in the fermentation chamber or cabinet (i.e., relaxation cabinet) allowing at least one hour for testing equipment to adjust to the 60° F. temperature;
(2) A 1000-gram sample of dough is taken from the mixer;
(3) Allow dough to relax approximately 5 minutes at room temperature from time sample is removed from mixer (i.e., handle per the above farinographic testing procedure);
(4) Remove outer dough surface with scissors;
(5) Weigh a 150-gram sample of dough;
(6) Dust dough sample lightly with dusting flour;
(7) Transfer sample to rounder-homogenizer on the Extensograph and round samples for 20 revolutions;
(8) Transfer sample to dough roller-type moulder and mould into cylinder;
(9) Evenly place dough cylinder into dough holder so that all prongs of holder are used;
(10) Dough holder is placed in a cradle contained in the relaxation cabinet;
(11) After 15 minutes structural relaxation in the relaxation cabinet, the dough sample and holder is placed on the Extensograph in position for stretching;
(12) Start kymograph with pen at zero, stop downward movement of hook immediately after dough breaks, lift pen from chart;
(13) Read and record from curves;

(a) total extensibility millimeters;
(b) maximum resistance to extension in Brabender units.

The testing apparatus employed herein in ascertaining the extenographic readings comprised an Extensograph Model E-1, supplied by C. W. Brabender Instruments and a temperature control bath therefor. Testing precision on duplicate samples was within ±10 mm. extensibility and ±40 Brabender units resistance.

Enhanced developed dough character is imparted by admixing during the second stage mixing step for a period of time sufficient to provide a resultant dough product which in combination with the first stage mixing step possesses an extensographic reading exhibiting a resistance to extension ranging from a maximum of about 500 to less than about 800 Brabender units and a maximum farinographic reading of at least 650 Brabender units but less than 1000 Brabender units. In a preferred embodiment of the invention, the dough ingredients are mixed during the second stage mixing step sufficiently to provide a maximum resistance to extension of about 650 Brabender units and extensibility of about 150 mm. and a maximum farinographic reading within the ranges of about 700 to about 900 Brabender units.

The resultant dough products possessing the aforementioned dough characteristics are suitable for further conventional dough processing and equipment therefor such as disclosed in U.S. Pats. Nos. 2,313,706; 2,478,618; 2,664,833; 3,048,314; 3,148,635; 3,154,986 and 3,279,927. The present doughs are particularly adapted to the commercial processing of laminated dough product which are presently distributed under refrigerated conditions in a conventional pressure retaining, spiral-wound fiber container. Such laminated dough products are normally prepared by passing the developed dough mass through a conventional dough break consisting of several sets of rollers which flatten the dough mass into a continuous dough sheet of approximately 1/8 inch thickness. Shortening is then placed upon the upper dough sheet surface and the dough sheet is then folded over with the shortening forming a thin separating layer between the folded dough sheets. The folded dough sheet is then passed through rollers which compress the dough sheet to a multilayer dough mass of about 1/8 inch thickness. This process of providing a shortening layer between a plurality of dough masses and resheeting thereof is normally repeated such that the resultant laminated dough product contains a multiplicity of dough layers (usually from 6 to 48) each of which is separated from one another with a thin layer of the shortening. Upon baking thereof, the homemaker is thus provided with a baked product possessing a flaked structure. Typical laminated dough products are biscuits, dinner rolls, Danish pastries, and the like.

The following examples are illustrative of the invention:

EXAMPLE 1

The following ingredients and amounts were employed in preparing a laminated, refrigerated dough product adapted for packaging and distribution in a conventional pressure retaining spiral-wound fiber container.

| Ingredients: | Parts by weight |
|---|---|
| First stage— | |
| Flour, hard wheat (12.2% by weight protein) | 50.00 |
| Water containing sufficient ice to maintain temperature during mixing at 57° F. | 29.46 |
| Egg yolk, enzyme processed, stabilized with low bacteria count | 0.98 |
| Shortening, solid beef | 2.45 |
| Potassium sorbate | 0.03 |
| Second stage— | |
| Leavening premix | 15.03 |
| Sodium anhydrous pyrophosphate | 1.66 |
| Sodium bicarbonate | 1.24 |
| Salt | 1.27 |
| Sugar | 6.85 |
| Flour | 4.01 |
| | 15.03 |

The equipment employed in mixing the dough ingredients was a horizontal bread dough mixer, Universal Model, size 3½ with a capacity of 250 pounds and a variable speed of 24 to 72 r.p.m. and manufactured by J. H. Day, Inc. The jacket coolant was maintained at 22° F. In preparing the dough product a sufficient amount of ice was added to the mixer to maintain the temperature of the dough ingredients at about 57° F. throughout the mixing thereof. The egg yolk and potassium sorbate were then uniformly blended together and added to the mixer. With the mixer operating at a slow speed (i.e., 34 r.p.m.), the shortening in a molten state (i.e., 135° F.) and water (i.e., that not added as ice) was introduced into the mixing bowl through a mixing spray nozzle. While continuously mixing the dough ingredients at a speed of 35 r.p.m. the floor was added and the mixing was completed by additional mixing at a high speed (i.e., 68 r.p.m.) for 11 minutes.

After completion of the first stage mixing step there then was added to the resultant dough a blended admixture of the leavening premix with continued mixing at a slow speed for about 30 seconds. The second stage mixing was then completed by mixing at a high speed for 2½ minutes.

The resultant dough product is then delivered to the sheeting line by dividing the dough into pieces of approximately 35 to 40 pounds in weight with each piece being passed through a conventional dough break consisting of several sets of rollers which flattened the dough into sheets.

The rolled sheets are then placed on a series of endless belt conveyor sheeting rollers which form them into a continuous sheet of dough approximately 1/8 inch thick by 18 inches wide. Solid shortening was then added to the upper dough sheet surface and the dough sheet was folded to provide a two-layered sheet separated by the shortening. The folded-over sheets were then passed through the conveyor rollers to provide a sheet 1/8 in thick by 18 inches wide. The lamination process of dough layer separated by shortening was successively repeated to provide a resultant laminated product consisting of 32 dough sheet layers each of which are separated by the shortening.

The resultant laminated product was then cut into the appropriate size and packaged in a conventional, pressurized, refrigerated dough container.

EXAMPLE 2

The following dough formulations were prepared pursuant to the methodology and equipment of Example 1. Runs 1 through 4 were control runs without potassium sorbate. Runs 5 and 6, on the other hand, contained 0.10 percent by weight potassium sorbate. All of the aforementioned doughs were prepared and mixed under identical conditions.

The first stage mixing step included all of the ingredients excepting the premix which was added after completion of the first stage mixing step. The first stage mixing step was conducted for ½ minute at 34 r.p.m. followed immediately by high speed mixing at 68 r.p.m. for 11 minutes. The second stage mixing step was conducted for ½ minute at 35 r.p.m. to disperse the premix ingredients into the resultant dough product from the first stage mixing step immediately followed by mixing at a high speed (i.e., 68 r.p.m.) for 2½ minutes.

| | Percent by weight | |
|---|---|---|
| Ingredients | Runs 1, 2, 3, 4 | Runs 5, 6 |
| Water | 15.860 | 15.860 |
| Ice | 13.550 | 13.550 |
| Potassium sorbate | | 0.100 |
| Color | 0.002 | 0.002 |
| Shortening | 6.050 | 6.050 |
| Sugar | 1.009 | 1.009 |
| Yeast flavor | 0.036 | 0.036 |
| Bread flavor | 0.033 | 0.033 |
| Egg yolk | 2.010 | 2.010 |
| Flour | 45.460 | 45.360 |
| Premix | 15.990 | 15.990 |
| Total | 100.000 | 100.000 |

Farinographic and extensographic readings were then obtained from the resultant dough products with the following results:

TABLE 1

| Run No. | Farinograph | | | Extensograph | | |
|---|---|---|---|---|---|---|
| | Minimum, BU | Maximum, BU | Peak, minutes | Resistance, 5 second BU | Resistance, maximum BU | Extensibility mm. |
| 1 | 680 | 740 | 15 | 800 | 1,000+ | 100 |
| 2 | 620 | 720 | 18 | 850 | 1,000+ | 100 |
| 3 | 700 | 750 | 15 | 730 | 1,000+ | 105 |
| 4 | 680 | 740 | 18 | 650 | 1,000+ | 125 |
| 5 | 750 | 790 | 10 | 480 | 570 | 155 |
| 6 | 760 | 830 | 9 | 500 | 640 | 145 |

From the aforementioned farinographic results in Table 1, it may be seen that the potassium sorbate containing doughs reached a peak farinographic reading much more readily than those without the potassium sorbate. The period of time necessary to reach a peak farinographic reading is an important factor in that it relates directly to the amount of mixing time essential to develop the dough structure. Shorter mixing time in achieving a peak farinographic reading provides the dough manufacturer with greater dough mixing efficiency.

From the extensographic readings of Runs 5 and 6, it is quite significant that the potassium sorbate containing doughs had a substantially reduced resistance reading at 5 seconds. The peak resistance (i.e., maximum extensographic reading) was also substantially reduced by the employment of potassium sorbate as a dough conditioning agent.

The doughs without the addition of potassium sorbate (i.e., Runs 1 through 4) exhibited a peak resistance of greater than 1000 Brabender units. Such a high resistance renders the dough products commercially unsuitable for high speed production of a refrigerated, laminated dough product.

From the extensographic readings, the doughs containing 0.10 percent by weight potassium sorbate exhibited approximately a 40 percent increase in the dough extensibility (in mm.) over that achieved from the doughs without the potassium sorbate. Dough handling and machinability of the potassium sorbate containing doughs was excellent.

EXAMPLE 3

Dough masses in Runs 7, 8, 9 and 10 respectively containing 0.00, 0.00, 0.10 and 0.15 percent by weight potassium sorbate were prepared with the mixing equipment per Example 2.

All of the ingredients, excepting the premix, the 10 percent by weight shortening, 2 percent by weight ice and potassium sorbate were admixed in the first stage mixing step. First stage mixing was conducted for ½ minute at a slow speed and then for 6 minutes at a high speed. The second stage mixing step was conducted for ½ minute at a slow speed and 5½ minutes at a high speed.

The following ingredients and amounts were employed:

| Ingredients | Percent by weight | | |
|---|---|---|---|
| | Runs 7, 8 | Run 9 | Run 10 |
| Water | 14.650 | 14.650 | 14.650 |
| Ice | 7.500 | 7.500 | 7.500 |
| Yeast | 5.000 | 5.000 | 5.000 |
| Shortening | 4.000 | 4.000 | 4.000 |
| Emulsifier | 1.800 | 1.800 | 1.800 |
| Color | 0.002 | 0.002 | 0.002 |
| Flour | 3.500 | 3.500 | 3.500 |
| Flour | 37.698 | 37.598 | 37.548 |
| Sugar | 2.000 | 2.000 | 2.000 |
| Egg yolk | 2.250 | 2.250 | 2.250 |
| Shortening | 10.000 | 10.000 | 10.000 |
| Ice | 2.000 | 2.000 | 2.000 |
| Premix | 9.600 | 9.600 | 9.600 |
| Potassium sorbate | | 0.100 | 0.150 |
| Total | 100.000 | 100.000 | 100.000 |

Farinographic and extensographic readings from the resultant dough masses obtained thereby are as follows:

TABLE 2

| | Farinograph | | | Extensograph | |
|---|---|---|---|---|---|
| | Minimum, BU | Maximum, BU | Peak, minutes | Resistance, maximum | Extensibility, mm. |
| Run No.: | | | | | |
| 7 | 550 | 700 | 9.5 | 650 | 85 |
| 8 | 570 | 700 | 9.0 | 640 | 105 |
| 9 | 550 | 680 | 4 | 510 | 115 |
| 10 | 570 | 760 | 3.5 | 320 | 110 |

From the aforementioned Table 2, it may be seen that potassium sorbate at a 0.10 and 0.15 percent by weight level reduced the dough resistance over the control samples of Runs 7 and 8 by respectively about 22 and 50 percent. Dough sheeting and machinability were much improved by the addition of potassium sorbate as a dough conditioning agent. Resistance of Run 10, however, was sufficiently low so that the resultant dough mass exhibited an undesirable property of being overstressed when being pulled between sheeting rolls.

EXAMPLE 4

The effects of potassium sorbate and sorbic acid were determined by physical measurements in the following dough formulations per the previous runs. Runs 11 through 17 were duplicated by repeating the same formulations and obtaining physical measurements on a subsequent day. The following ingredients and amounts thereof were employed:

| Ingredients | Percent by weight | | | | | | |
|---|---|---|---|---|---|---|---|
| | Run 11— control | Run 12— Potassium sorbate, 0.025% | Run 13— Potassium sorbate, 0.025% | Run 14— Potassium sorbate, 0.05% | Run 15— Sorbic acid, 0.0125% | Run 16— Sorbic acid, 0.025% | Run 17— Sorbic acid 0.05% |
| Water | 30.660 | 30.660 | 30.660 | 30.660 | 30.660 | 30.660 | 30.660 |
| Yolk | 1.000 | 1.000 | 1.000 | 1.000 | 1.000 | 1.000 | 1.000 |
| Shortening | 2.500 | 2.500 | 2.500 | 2.500 | 2.500 | 2.500 | 2.500 |
| Flour | 50.500 | 50.4875 | 50.475 | 50.450 | 50.4875 | 50.475 | 50.450 |
| Premix | 15.340 | 15.340 | 15.340 | 15.340 | 15.340 | 15.340 | 15.340 |
| Potassium sorbate | | 0.0125 | 0.025 | 0.050 | | | |
| Sorbic acid | | | | | 0.0125 | 0.025 | 0.050 |
| Total | 100.000 | 100.000 | 100.000 | 100.000 | 100.000 | 100.000 | 100.000 |

Farinographic and extensographic results in duplicate were as follows:

TABLE 3

| | Farinograph | | | Extensograph | | |
|---|---|---|---|---|---|---|
| | Minimum, BU | Maximum, BU | Peak, minutes | Resistance, 5 seconds | Resistance, maximum | Extensibility, minimum |
| Run No. 11: | | | | | | |
| Control A | 750 | 820 | 19 | 1000+ | 1000+ | 130 |
| Control B | 740 | 810 | 16.5 | 1000+ | 1000+ | 125 |
| Run No. 12: | | | | | | |
| 0.0125% A | 780 | 850 | 18.5 | 580 | 950 | 180 |
| Potassium sorbate B | 760 | 830 | 14 | 720 | 1000+ | 175 |
| Run No. 13: | | | | | | |
| 0.05% A | 780 | 840 | 15 | 550 | 870 | 200 |
| Potassium sorbate B | 770 | 840 | 13.5 | 470 | 780 | 240+ |
| Run No. 14: | | | | | | |
| 0.050% A | 780 | 860 | 13.5 | 520 | 750 | 240+ |
| Potassium sorbate B | 770 | 830 | 11.5 | 480 | 740 | 240+ |
| Run No. 15: | | | | | | |
| 0.0125% A | 780 | 860 | 19.5 | 620 | 970 | 210 |
| Sorbic acid B | 770 | 840 | 13 | 800 | 1000+ | 130 |
| Run No. 16: | | | | | | |
| 0.025% A | 780 | 840 | 14.5 | 540 | 840 | 210 |
| Sorbic acid B | 760 | 840 | 16 | 600 | 860 | 195 |
| Run No. 17: | | | | | | |
| 0.050% A | 760 | 850 | 14 | 480 | 710 | 240+ |
| Sorbic acid B | 770 | 830 | 15.5 | 580 | 870 | 240+ |

In preparing the dough products per this example, the farinograph was employed as a dough mixer. The temperature of the dough ingredients during mixing was maintained at 60° F. The first stage mixing was for 6½ minutes and included all of the ingredients except the leavening containing premix portion. In the first stage mixing, the yolk, flour and conditioning agent were preblended together and droplets of molten shortening were slowly added to the ingredients mixed in the farinograph bowl. After mixing for 6½ minutes, the premix was added and mixing was continued for an additional 2½ minutes.

Whereas farinographic measurements of all runs were well within experimental limits of the farinographic bowl errors, both potassium sorbate and sorbic acid enhanced the dough properties by decreasing resistance and increasing extensibility. Both of the aforementioned extensographic factors were dependent upon the amount of conditioning agent employed (e.g., compare respective differences between the above 0.0125, 0.025 and 0.05 percent extensographic readings in Runs 12 through 17).

were first added to the mixer followed by incorporation of atomized shortening therein with mixing. The egg yoke was then added to the mixer. The flour, followed by the preblend of flour and conditioning agent (13 parts to 1 part by weight) were then added and the resultant ingredients were mixed for 45 seconds at 33 r.p.m. Dough development was completed by mixing at a high speed (i.e., 78 r.p.m.) for 14 minutes. The cheese and premix were then added and mixed at 33 r.p.m. for 2 minutes and then at 78 r.p.m. for 3 minutes. The following ingredients were employed:

| Ingredients | Percent by weight | | |
|---|---|---|---|
| | Run 18 | Run 19 | Run 20 |
| Premix | 13.223 | 13.223 | 13.223 |
| Water | 29.598 | 30.598 | 31.698 |
| Yolk | 0.862 | 0.862 | 0.862 |
| Shortening | 2.155 | 2.155 | 2.155 |
| Flour | 43.830 | 42.611 | 41.687 |
| Cheese | 10.344 | 10.344 | 10.344 |
| Sodium stearyl lacylate | | 0.219 | |
| Potassium sorbate | | | 0.043 |

The effect of 0.043 percent potassium sorbate in cheese dough resulted in significant reduction in dough resistance and an increase in extensibility as indicated below.

TABLE 4

| | Farinograph | | | | Extensograph | | |
|---|---|---|---|---|---|---|---|
| | Dough development temperature °F. | Minimum, BU | Maximum, BU | Peak, minutes | Resistance, 5 seconds | Resistance, maximum | Extensibility, mm. |
| Run No.: | | | | | | | |
| 18 | 58 | 780 | 910 | 20.5 | 970 | 1,000+ | 105 |
| 19 | 49 | 790 | 950 | 21 | 1,000+ | 1,000+ | 100 |
| 20 | 56 | 620 | 710 | 12 | 480 | 590 | 135 |

EXAMPLE 5

The effect of potassium sorbate at 0.043 percent by weight of a cheese dough in a dough was investigated. The equipment and method employed in preparing the dough products pursuant to this example was substantially the same as that of Example 2. The mixer was a laboratory-scale, horizontal bread dough mixer manufactured by J. H. Day, Hercules Model, size 75 with 50-pound capacity and variable mixing speeds. The ice and water From the above extensographic results the potassium sorbate reduced the dough resistance, increased the extensibility with an accompanying reduction in mixing time.

EXAMPLE 6

Using the farinograph as the mixing means and with the ingredient formulation of Example 5 excepting the indicated changes in the amount and type of dough conditioning agents, the following farinographic and extensographic readings were obtained:

TABLE 5

| | | Farinograph | | | Extensograph | | |
|---|---|---|---|---|---|---|---|
| Run No. | Treatment | Minimum, BU | Maximum, BU | Peak, minutes | Resistance, 5 seconds | Resistance, maximum | Extensibility, mm. |
| 21 | Control (no additive) | 720 | 800 | 20.5 | 1000+ | 1000+ | 110 |
| 22 | 0.05% potassium sorbate | 830 | 970 | 9 | 760 | 930 | 155 |
| 23 | 0.1% potassium sorbate | 1030 | 1130 | 8 | 610 | 670 | 155 |
| 24 | 0.5% sodium stearyl lactylate | 880 | 930 | 10 | 1000+ | 1000+ | 120 |
| 25 | 0.5% whey cysteine bromate [1] | 1000 | 1020 | 7.5 | 890 | 1000+ | 125 |
| 26 | Control, +20% increase in leaving | 870 | 930 | 16 | 1000+ | 1000+ | 105 |

[1] Per the preferred embodiment of U.S. Patent No. 3,053,666 by Henika, et al.

The potassium sorbate containing doughs provided exceptional machinability and dough handling properties for the commercial production of refrigerated, laminated dough products.

Doughs exhibiting an extensographic resistance of greater than 1000 (e.g., Runs 21 and 24 through 26) performed poorly in respect to dough sheeting, machinability and handling character and thus are unsuitable for commercial production of refrigerated wafer or laminated dough products therefrom.

Both control Runs 21 and 26 (containing no dough conditioning agents) exhibited a high resistance, low extensibility and respectively a 20.5 and 16 minute farinographic testing time to achieve a maximum farinographic reading. Although sodium stearyl fumarate and whey crysteine bromate in Runs 24 and 25 reduced the mixing time necessary to achieve a maximum farinographic reading, both conditioning agents failed to appreciably reduce the extensographic resistance. The potassium sorbate containing doughs provided a reduced mixing time necessary for the maximum farinographic reading as well as greatly reducing the maximum extensographic resistance reading with improved extensibility.

What is claimed is:

1. A method of preparing a chemically leavened dough composition possessing improved dough handling and machining properties, said method comprising:
   (a) providing a dough ingredient composition containing 50 parts by weight flour, water in an amount ranging from about 25 to about 35 parts by weight, chemical leavening and at least one edible dough conditioning agent selected from the group consisting of sorbic acid, the alkaline earth salts of sorbic acid and the alkali metal salts of sorbic acid in an amount ranging from about 0.005 to about 0.20 part by weight dough conditioner for each 50 parts by weight flour; and
   (b) mixing the dough ingredient composition at a temperature of less than 65° F. for a period of time and under mixing conditions sufficient to provide a dough characterized as exhibiting a maximum extensographic resistance to extension ranging from at least 400 Brabender units and less than 900 Brabender units and an extensibility of greater than 100 millimeters but less than about 200 millimeters, said dough mass being further charactetrized as having a maximum farinographic reading of greater than 600 but less than about 1300 Brabender units.

2. The method according to claim 1 wherein the mixing is sufficient to provide a dough exhibiting a maximum extensographic reading of resistance to extension ranging from about 500 to less than 800 Brabender units and a maximum farinographic reading ranging from at least 650 to less than 1000 Brabender units.

3. The method according to claim 2 wherein the dough ingredient composition is comprised of about 27 to about 33 parts by weight water and from about 0.01 to about 0.1 part by weight dough conditioner for each 50 parts by weight flour.

4. The method according to claim 3 wherein the dough conditioning agent is at least one member selected from the group consisting of sorbic acid, potassium sorbate and calcium sorbate.

5. The method according to claim 4 wherein the farinographic reading ranges from about 700 to about 900 Brabender units.

6. The method according to claim 5 wherein the dough ingredient composition is comprised of about 30 parts by weight water and from about 0.015 to about 0.05 part by weight dough conditioner for each 50 parts by weight flour.

7. The method according to claim 6 wherein the dough conditioning agent is sorbic acid.

8. The method according to claim 6 wherein the dough conditioning agent is potassium sorbate.

9. The method according to claim 6 wherein the dough ingredient composition is mixed at a temperature ranging from about 55° F. to about 60° F. and the dough is further characterized as having a maximum resistance to extension of about 650 Brabender units, extensibility of about 150 millimeters and a maximum farinographic reading within the range of about 700 to about 900 Brabender units.

10. A method for preparing a chemical leavened dough possessing improved dough mixing, machining and handling properties, said method comprising the steps of:
   (a) providing an ingredient composition comprised of 50 parts by weight flour, water in an amount ranging from about 25 to about 35 parts by weight and an edible dough conditioning agent of at least one member selected from the group consisting of sorbic acid, the alkaline earth salts of sorbic acid and the alkali metal salts of sorbic acid in an amount ranging from about 0.005 to about 0.20 part by weight dough conditioner for each 50 parts by weight flour;
   (b) mixing said ingredients at a temperature of less than 65° F. and for a period of time sufficient to provide a dough characterized as having a maximum farinographic reading of greater than 400 Brabender units but less than about 700 Brabender units;
   (c) adding to the dough at least one leavening agent selected from the group consisting of an edible leavening acid and an edible leavening base; and
   (d) mixing the dough containing the added leavening agent at a temperature of less than 65° F. under mixing conditions sufficient to provide a dough mass characterized as exhibiting a maximum extensographic resistance to extension ranging from at least 400 Brabender units and less than 900 Brabender units and an extensibility of greater than 100 millimeters but less than about 200 millimeters, said dough being further characterized as having a maximum farinographic reading of greater than 600 but less than 1300 Brabender units.

11. The method according to claim 10 wherein the mixing steps are conducted at a temperature ranging from about 50° F. to 65° F. and the dough conditioning agent is selected from the group consisting of sorbic acid, potassium sorbate and calcium sorbate.

12. The method according to claim 11 wherein the added leavening includes at least a major portion by weight of the leavening base.

13. The method according to claim 12 wherein the dough ingredient composition is comprised of about 27 to about 33 parts by weight water and from about 0.01 to about 0.1 part by weight dough conditioning agent for each 50 parts by weight flour.

14. The method according to claim 13 wherein the cumulative effect of mixing is sufficient to provide a resultant dough exhibiting a maximum extensographic reading of resistance to extension ranging from about 500 to less than 800 Brabender units and a maximum farinographic reading ranging from at least 650 to less than 1000 Brabender units.

15. The method according to claim 14 wherein at least 90 percent by weight of the leavening acid and leavening base is added after the dough ingredients have achieved a maximum farinographic reading of at least 400 but less than 700 Brabender units.

16. The method according to claim 15 wherein the mixing steps are conducted at a temperature ranging from about 55° F. to about 60° F.

17. The method according to claim 16 which includes the additional steps of forming a laminated dough mass comprised of a plurality of dough sheets with a thin layer of shortening between each of said dough sheets.

18. The method according to claim 16 which includes the additional step of cutting the laminated dough mass into a size suitable for packaging in a pressure retaining container and packaging said cut laminated dough mass therein.

19. The method according to claim 18 wherein the dough ingredient composition is mixed under conditions sufficient to provide a dough characterized as having a maximum resistance to extension of about 650 Brabender units and extensibility of about 150 millimeters and a maximum farinographic reading within the range of about 700 to about 900 Brabender units.

20. The method according to claim 19 wherein the dough ingredient composition is comprised of about 30 parts by weight water and from about 0.015 to about 0.05 part by weight dough conditioner for each 50 parts by weight flour.

References Cited

UNITED STATES PATENTS

| | | | |
|---|---|---|---|
| 3,142,737 | 7/1964 | Erekson et al. | 99—90 |
| 3,404,987 | 10/1968 | Kooistra et al. | 99—90X |

RAYMOND N. JONES, Primary Examiner

J. R. HOFFMAN, Assistant Examiner

U.S. Cl. X.R.

99—92, 172